(12) United States Patent
Ogawa

(10) Patent No.: US 7,238,904 B2
(45) Date of Patent: Jul. 3, 2007

(54) AUTOMOTIVE AIR CONDITIONING SWITCH SYSTEM

(75) Inventor: Satoshi Ogawa, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/494,714

(22) Filed: Jul. 28, 2006

(65) Prior Publication Data

US 2007/0029181 A1 Feb. 8, 2007

(30) Foreign Application Priority Data

Aug. 2, 2005 (JP) .................... P. 2005-224322

(51) Int. Cl.
- *H01H 19/00* (2006.01)
- *H01H 19/14* (2006.01)
- *H01H 21/00* (2006.01)
- *H01H 3/08* (2006.01)

(52) U.S. Cl. .................... 200/336; 200/524; 200/526
(58) Field of Classification Search .................. 200/336
See application file for complete search history.

(56) References Cited

U.S. PATENT DOCUMENTS 4,950,845 A 8/1990 Kuroyanagi et al.
6,588,675 B2* 7/2003 Miyai et al. ............... 236/51
6,670,567 B1* 12/2003 Koseki et al. ............. 200/564
2005/0064808 A1* 3/2005 Ogawa et al. ............. 454/69
2005/0098642 A1* 5/2005 Ogawa et al. ............. 237/12

* cited by examiner

*Primary Examiner*—Lincoln Donovan
*Assistant Examiner*—Lheiren Mae A. Anglo
(74) *Attorney, Agent, or Firm*—Morgan, Lewis & Bockius LLP

(57) ABSTRACT

When a dial is operated to rotate forward to a DEF position with a knob 52 staying in a depressed state, a cam portion 12 operates a key operating portion 56 to move in an approaching direction in which the key operating portion 56 approaches a reset key 39, so as to operate the reset key 39 as a result of the key operating portion 56 moving in the approaching direction. Then, a push button 31 returns from a depressed position to a normal position, and interlocking with the push button 31, the knob 52 returns from the depressed state to a normal state. Due to this, since the driver only has to operate the dial 4 to rotate forward to the DEF position so that the knob 52 can be forced to return from the depressed state to the normal state, the operability is increased.

1 Claim, 5 Drawing Sheets

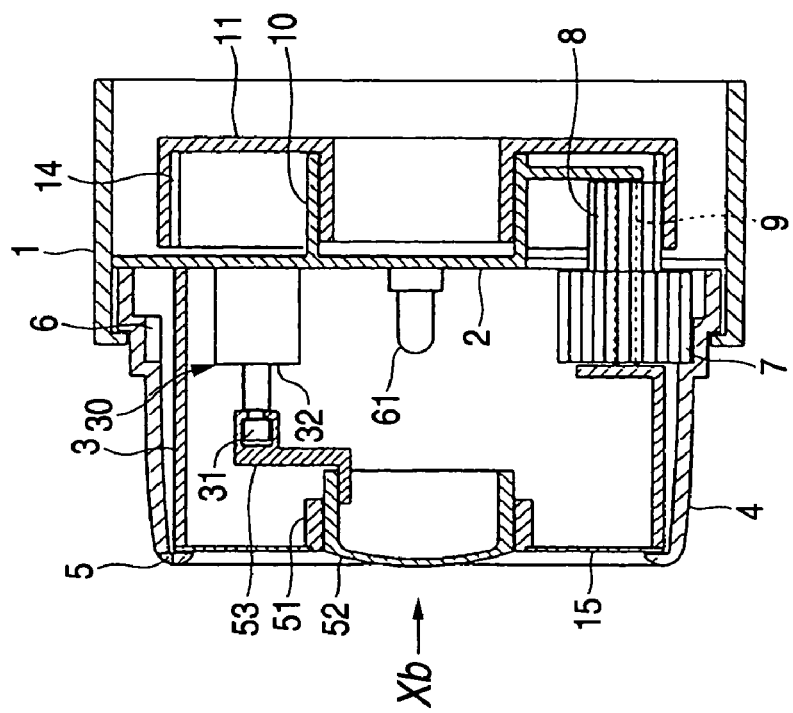
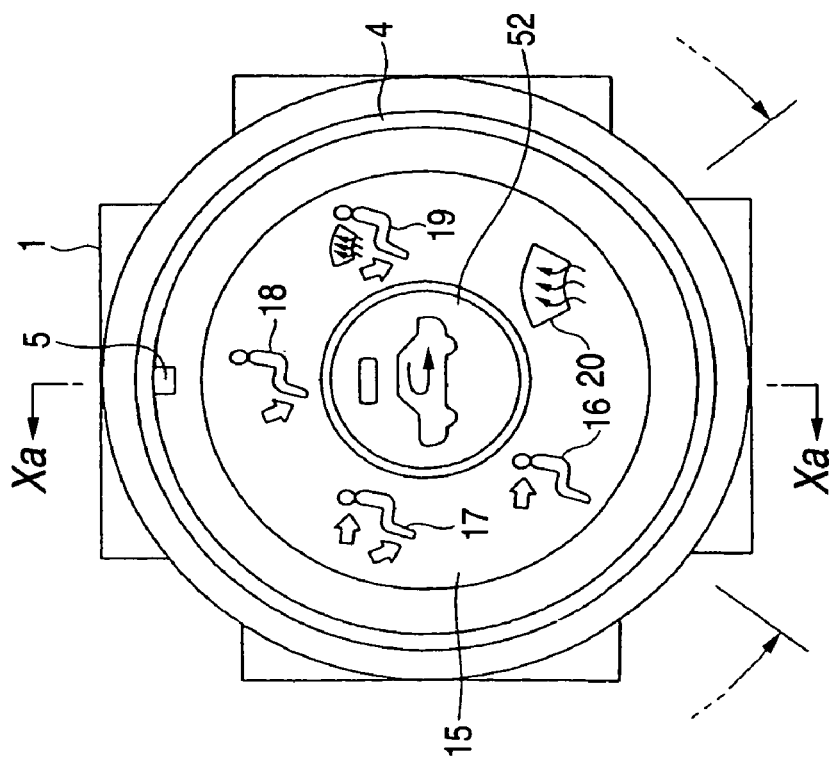

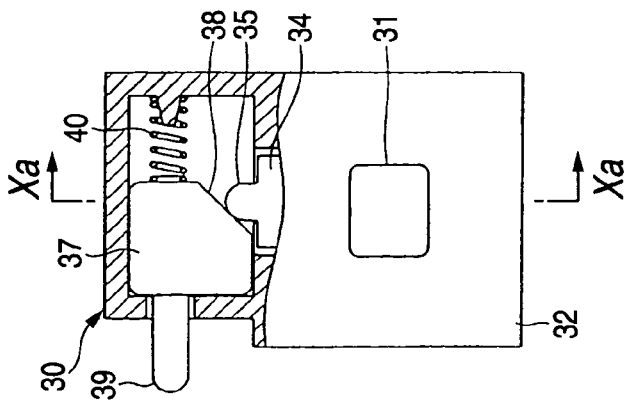
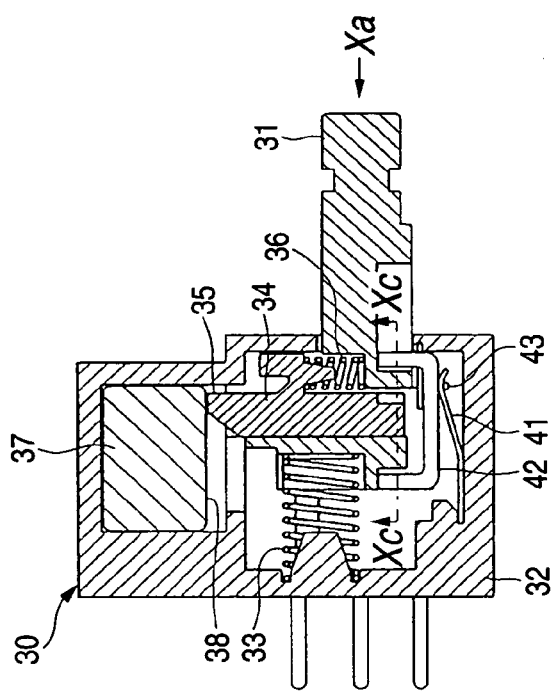
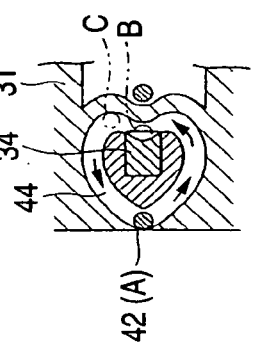

AUTOMOTIVE AIR CONDITIONING SWITCH SYSTEM

BACKGROUND OF THE INVENTION

The present invention relates to an automotive air conditioning switch system which remotely controls an on-board air conditioner from a passenger compartment of a vehicle.

Among air conditioning switch systems of the type that has been described above, there is an air conditioning switch system having a configuration in which a knob is mounted on an inner circumferential portion of a dial. In the case of this configuration, air inlets are changed over as a result of the knob being operated to be pressed, and air outlets are changed over as a result of the dial being operated to rotate.

In the case of the air conditioning switch system that has been described above, since the knob needs to be operated individually when changing over the air inlets, there still exists room for improvement with respect to operability.

SUMMARY OF THE INVENTION

The invention was made in view of the situations, and an object thereof is to provide an automotive air conditioning switch system which can provide superior operability by allowing the knob to operate automatically only through rotational operation of the dial.

1. An automotive air conditioning switch system comprising:

a dial provided so as to be operated to rotate;

a switch including a push button adapted to be locked in a depressed position by being pressed from a normal position and to be restored to the normal position by being pressed from the depressed portion, and a key for restoring the push button from the depressed position to the normal position;

a knob linked to the push button for operating the push button;

a key operating member movable in an approaching direction in which the key operating member approaches the key and in a separating direction in which the key operating member separates from the key, the key operating member operating the key by moving in the approaching direction;

a stopper member for standing still relative to the key operating member;

a spring member adapted to be brought into contact with the stopper member by moving the key operating member in the separating direction so that the spring member is deformed elastically to bias the key operating member in the approaching direction; and a cam member for moving in response to a rotational operation of the dial, wherein, when the dial is operated to rotate forward to a specific position, the cam member moves the key operating member in the approaching direction to operate the key, and when the dial is operated to rotate backward to a specific position, the cam member moves the key operating member in the separating direction, and wherein, when the dial is operated to rotate further forward to pass the specific position, the key operating member returns to a neutral state where no operation force is applied to the key due to returning force of the key, and when the dial is operated to rotate further backward to pass the specific position, the key operating member returns to the neutral state due to the elastic restoring force of the spring member.

When the push button of the switch is locked in the depressed position, the knob interlocks with the push button to thereby be locked in a depressed state. When the dial is operated to rotate forward to the specific position with the knob locked in the depressed state, the cam member operates the key operating member to move in the approaching direction, whereby the key of the switch is operated as a result of the key operating member moving in the approaching direction. Then, the push button is restored from the depressed position to the normal position, and the knob interlocks with the push button to thereby be restored from the depress state to a normal state. Due to this, since the driver only has to operate the dial to rotate forward to the specific position so that the knob can forcibly be returned from the depressed state to the normal state, the operability is increased.

The operation force applied to the key operating member from the cam member disappears when the dial has passed the specific position in a forward rotating direction. Then, the key operating member returns to the neutral state by virtue of the returning force of the key, and the operation force applied to the key from the key operating member disappears. When the knob is operated to be pressed in this state, the push button moves from the normal position to the depressed position, and interlocking with the locking of the push button in the depressed position, the knob is locked in the depressed state. When the knob is operated to be pressed while in the depressed state, the push button returns from the depressed position to the normal position, and interlocking with the push button, the knob returns from the depressed position to the normal position. Due to this, after the driver forcibly returns the knob to the normal state, the knob can be operated freely between the normal state and the depressed state.

When the dial is operated to rotate backward to the specific position, the cam member operates the key operating member to move in the separating direction, and interlocking with the key operating member, the spring member moves in the separating direction. Then, the spring member is elastically deformed as a result of being brought into contact with the stopper member and biases the key operating member in the approaching direction by virtue of elastic restoring force thereof. After the dial has passed the specific position, operation force applied to the key operating member from the cam member disappears, whereby the key operating member returns to the neutral state by virtue of the elastic restoring force of the spring member. Namely, when the dial is operated to rotate backward with the knob locked in the depressed state, no operation force is applied to the key from the key operating member, whereby the knob is held in the depressed state, and therefore, a forcible returning function of the knob can be made to be triggered only when the dial is operated to rotate forward.

BRIEF DESCRIPTION OF THE DRAWINGS

FIG. 1 is drawings showing a first embodiment (FIG. 1A is a sectional view taken along the line Xa, and FIG. 1B is a view resulting when viewed in a direction indicated by Xb).

FIGS. 3A to 3C are drawings showing the inside air/outside air changing over switch (FIG. 3A is a sectional view taken along the line Xa, FIG. 3B is a view resulting when viewed in a direction indicated by Xa, and FIG. 3C is a sectional view taken along the line Xc).

DETAILED DESCRIPTION OF PREFERRED EMBODIMENTS

Figure 2:
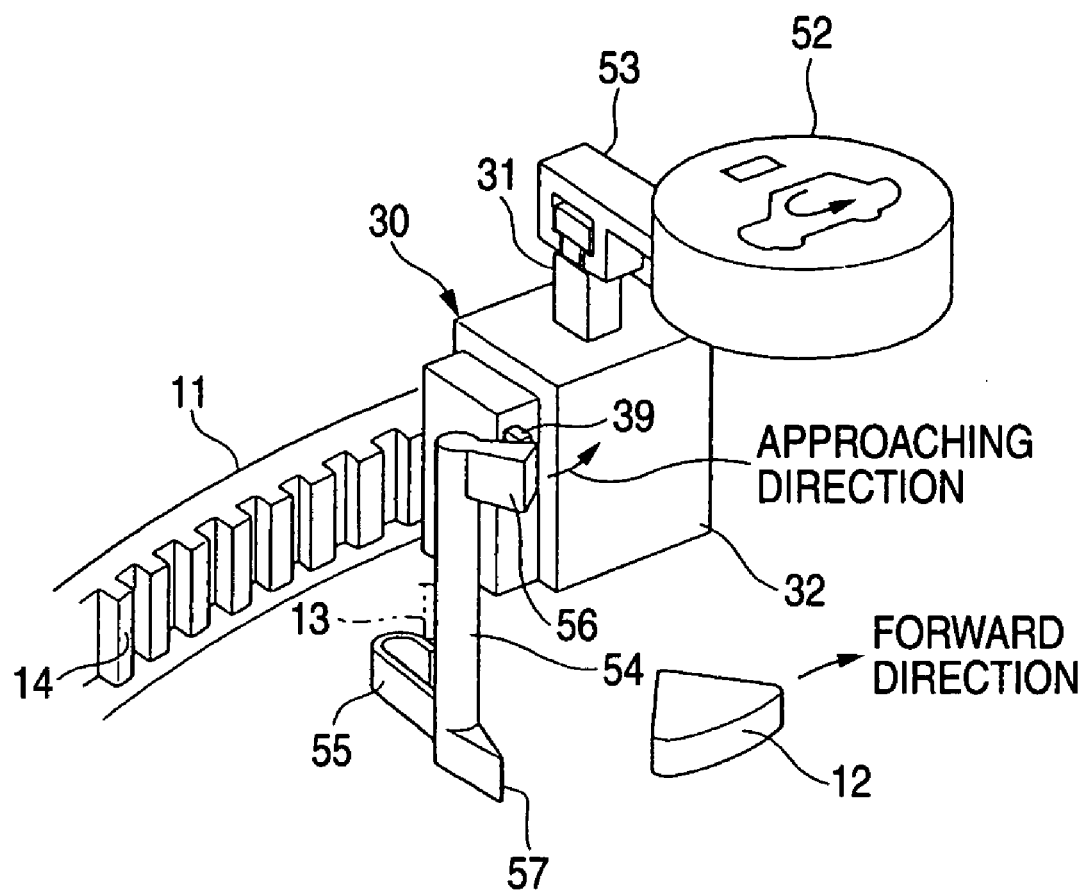
FIG. 2 is a perspective view showing a reset mechanism of an inside air/outside air changing over switch.

As shown in FIG. 1, an insulator 2, which corresponds to a substrate, is fixed in an interior of a switch base 1. This insulator 2 is such as to hold a switch circuit and is made from synthetic resin through injection molding. The switch circuit is such as to denote a plurality of conductor plates embedded in the insulator 2. The plurality of conductor plates are made of copper plates to which a surface treatment such as plating with tin is applied and are integrated with the insulator 2 by being insert molded therein.

A cylindrical dial base 3 is fixed to the insulator 2. This dial base 3 is such as to be formed from a material such as a white opaque synthetic resin, and a plurality of slits are formed in the dial base 3 which function as light paths. A cylindrical dial 4 is mounted rotatably on an outer circumferential portion of the dial base 3, and a pointer 5 made from a transparent synthetic resin is fixed to the dial 4. This pointer 5 is such as to indicate an operating position of the dial 4, and a toothed portion 6 is formed on an inner circumferential surface of the dial 4. A primary gear 7 of a large diameter is caused to mesh with the toothed portion 6, and a secondary gear 8 of a small diameter is fixed to the primary gear 7. The primary gear 7 and the secondary gear 8 are such as to share a shaft 9, and the shaft 9 is mounted rotatably on both the insulator 2 and the dial base 3.

A cylindrical gear guide 10 is formed on the insulator 2, and a dial gear 11 is mounted rotatably on the gear guide 10. This dial gear 11 is such as to be formed into a cylindrical shape with one end face closed, and a cam portion 12, which is formed into a triangular plate-like shape, is formed on a bottom surface of the dial gear 11, as shown in FIG. 2. This cam portion 12 is such as to correspond to the cam member.

A toothed portion 14 is formed on an inner circumferential surface of the dial gear 11. As shown in FIG. 1, the secondary gear 8 is caused to mesh with the toothed portion 14, whereby when the dial 4 is operated to rotate, an operation force is transmitted from the toothed portion 6 of the dial 4 to the toothed portion 14 via the primary gear 7 and the secondary gear 8, and the dial gear 11 rotates together with the dial 4 in the same direction. One end portion of a cable is connected to the dial gear 11, and the other end portion of the cable is adapted to move to a position corresponding to an operating position of the dial 4.

An annular mark plate 11 is fixed to the dial base 3. Position marks 16 to 20 are formed on this mark plate 15, and an operating position of the dial 4 where the pointer 5 indicates the position mark 16 is referred to as a FACE position, an operating position of the dial 4 where the pointer 5 indicates the position mark 17 is referred to as a B/L position, an operating position of the dial 4 where the pointer 5 indicates the position mark 18 is referred to as a FOOT position, an operating position of the dial 4 where the pointer 5 indicates the position mark 19 is referred to as an F/D position, and an operating position of the dial 4 where the pointer 5 indicates the position mark 20 is referred to as a DEF position. This dial 4 is such as to be made to rotate in a reciprocating fashion between the FACE position and the DEF position, and a direction from the FACE position towards the DEF position is referred to as a forward rotating direction, whereas a direction from the DEF position to the FACE position is referred to as a backward rotating direction.

The other end portion of the cable is connected to an on-board air conditioner, and the air conditioner detects the operating position of the dial 4 based on the position to which the other end portion of the cable is moved and selectively opens an air outlet or outlets of a plurality of air outlets according to the results of the detection of the operating position of the dial 4 as shown below under 1) to 5).

1) When the dial 4 is operated to the FACE position, a FACE outlet is opened. This FACE outlet is an outlet from which air is blown towards the head of the driver.

2) When the dial 4 is operated to the B/L position, the FACE outlet and a FOOT outlet are opened. This FOOT outlet is an outlet from which air is blown towards the legs of the driver.

3) When the dial is operated to the FOOT position, the FOOT outlet is opened.

4) When the dial is operated to the F/D position, the FOOT outlet and a DEF outlet are opened. This DEF outlet is an outlet from which air is discharged towards the inside of a windshield of a vehicle.

5) When the dial 4 is operated to the DEF position, the DEF outlet is opened.

An inside air/outside air changing over switch 30 is installed on the insulator 2. This inside air/outside air changing over switch 30 is such as to have a push button 31 which can move rectilinearly between a normal position, a depressed position and a reset position, and when the push button 31 is stopped in the normal position, the inside air/outside air changing over switch 30 is electrically switched off, whereas when the push button 31 is stopped in the depressed position, the switch 30 is electrically switched on. This inside air/outside air changing over switch 30 is electrically connected to the air conditioner via the switch circuit of the insulator 2, whereby the air conditioner selectively opens an outside air inlet when the inside air/outside air changing over switch 30 is in an OFF state and selectively opens an inside air inlet when the inside air/outside air changing over switch 30 is in an ON state. The outside air inlet is an inlet from which air outside the vehicle is taken into the vehicle, and outside air is supplied into the interior of a passenger compartment from the outside air inlet via the air outlets in such a state that the outside air inlet is opened. The inside air inlet is an inlet from which air inside the passenger compartment is taken in, and inside air is supplied to the interior of the passenger compartment from the inside air inlet via the outlets in such a state that the inside air inlet is opened. Hereinafter, the configuration of the inside air/outside air changing over switch 30 will be described in detail.

A switch case 32 is fixed to the insulator 2. The push button 31 is mounted on the switch case 32, and a return spring 33 made up of a compression coil spring is, as shown in FIG. 3, interposed between the push button 31 and the switch case 32. A pusher 34 is accommodated in the push button 31, and a projecting reset operating portion 35 is formed on the pusher 34. This pusher 34 is such as to be adapted to slide between an initial position where the reset operating portion 35 project from the inside of the push button 31 and a depressed position where the reset operating portion 35 is withdrawn into the inside of the push button 31, and a pusher spring 36 made up of a compression coil spring is interposed between the pusher 34 and the push button 31.

A reset cam 37 is accommodated in the switch case 32, and an inclined cam surface 38 and a projecting reset key 39 are formed on the reset cam 37. This reset cam 37 is such as to be adapted to slide between an initial position where the reset key 39 projects from the inside of the switch case 32 and a reset position where the reset key 39 is withdrawn into the switch case 32, and a reset spring 40 made up of a compression coil spring is interposed between the reset cam 37 and the switch case 32. This reset spring 40 is such as to hold the reset cam 37 in the initial position, and the pusher 34 is held in the initial position as a result of the reset operating position 35 of the pusher 34 being brought into contact with the cam surface 38 by virtue of the spring force of the pusher spring 36 in such a state that the reset cam 37 is held in the initial position.

A lock spring 41 is accommodated in the switch case 32. This lock spring 41 is such as to be made up of a leaf spring which is formed into the shape of a "V", and one end portion of the lock spring 41 is fixed to the switch case 32. A lock pin 42 which is formed into the shape of U is connected to the other end portion of the lock spring 41 in such a manner as to rotate about a shaft 43, and one end portion of the lock pin 42 is inserted into an interior of a heart-shaped cam groove 44. This cam groove 44 is such as to be formed in the push button 31 and the pusher 34, and the push button 31 is held in a normal position as a result of the one end portion of the lock pin 42 being brought into engagement with an inner circumferential surface of the cam groove 44 at a location A.

When the push button 31 is pressed from the normal position, the one end portion of the lock pin 42 is brought into engagement with the inner circumferential surface of the cam groove 44 at a location B as a result of relatively moving along the inner circumferential surface of the cam groove 44 as indicated by arrows, whereby the push button 31 is locked in a depressed position by virtue of engaging force between the lock pin 42 and the cam groove 44. When the push button 31 is pressed from the depressed position, the one end portion of the lock pin 42 reaches a location C as a result of relatively moving along the inner circumferential surface of the cam groove 44 as indicated by the arrows. The position where the one end portion of the lock pin 42 has reached the location C is the reset position of the push button 31, and when operation force applied to the push button 31 is removed at the reset position, the one end portion of the lock pin 42 relatively moves from the location C to the location A along the inner circumferential surface of the cam groove 44 by virtue of the spring force of the return spring 33, whereby the push button 31 returns from the reset position to the normal position.

When the reset key 39 is pressed against the spring force of the reset spring 40, the reset cam 37 moves from the initial position to the reset position, and the cam surface 38 of the reset cam 37 comes to press against the reset operating portion 35 of the pusher 34. Then, the pusher 34 moves from the initial position to the depressed position against the spring force of the pusher spring 36 to thereby press against the lock pin 42. Due to this, the lock pin 42 moves against the spring force of the lock spring 41 to thereby be dislocated from the cam groove 44. Consequently, when the reset key 39 is operated in such a state that the push button 31 is locked in the depressed position, the push button 31 returns by itself from the depressed position to the normal position by bypassing the reset position by virtue of the spring force of the return spring 33. The inside air/outside air changing over switch 30 is configured as has been described heretofore.

As shown in FIG. 1, a cylindrical knob guide 51 is fixed to the mark plate 15. A knob 52 is slidably fitted in an inner circumferential surface of the knob guide 51, and a button operating portion 53 is fixed to the knob 52. This button operating portion 53 is linked to the push button 31 of the inside air/outside air changing over switch 30, whereby the knob 52 stops in an outside air position when the push button 31 stops in the normal position and stops in an inside air position by virtue of locking force of the push button 31 when the push button 31 stops in the depressed position. This knob 52 is such as to operate the push button 31, and when the knob 52 is pressed from the outside position, interlocking with the locking of the push button 31 in the depressed position, the knob is locked in the inside air position. When the knob 52 is pressed directly while being locked in the inside air position, interlocking with the return of the push button 31 from the depressed position to the normal position, the knob 52 returns to the outside air position, and when the reset key 39 of the inside air/outside air changing over switch 30 is pressed in such a state that the knob 52 is locked in the inside air position, interlocking with the return of the push button 31 from the depressed position to the normal position, the knob 52 returns to the outside air position.

Figure 5A:
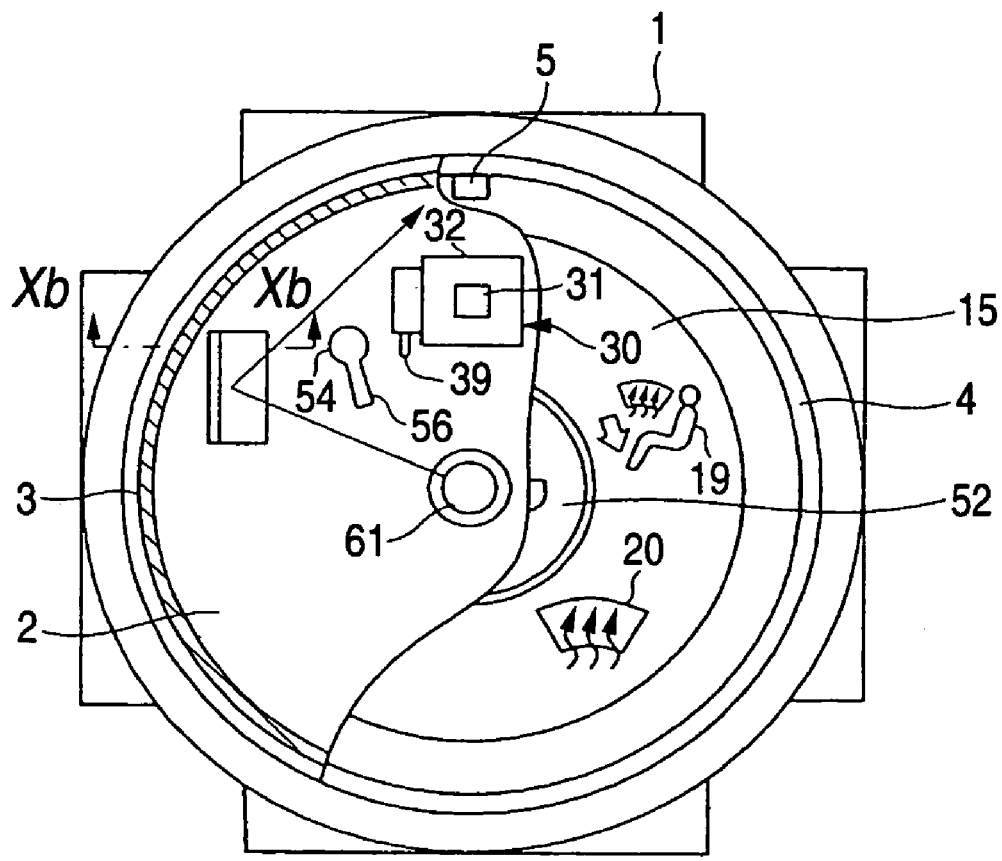
FIG. 5A is drawing corresponding to FIG. 1B, which shows an internal configuration of a switch system by cutting away part thereof.
Figure 5B:
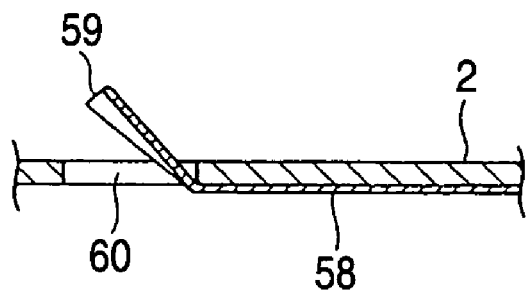
FIG. 5B is a sectional view taken along the line Xb.

As shown in FIG. 5, a shaft 54 is mounted rotatably on the insulator 2. As shown in FIG. 2, a spring portion 55 which is formed into the shape of a ring having terminating ends, a rectangular plate-shaped key operating portion 56 and a shaft operating portion 57 which is formed into the shape of a triangular plate are formed on the shaft 54, and the shaft 54 is held in a neutral state as a result of the spring portion 55 being brought into contact with a stopper portion 13 and the key operating portion 56 being brought into contact with the reset key 39 of the inside air/outside air changing over switch 30. This stopper portion 13 is such as to be formed on the insulator 2 which stands still relative to the shaft 54, and with the shaft 54 lying in the neutral state, no effective operation force is applied to the reset key 39 from the key operating portion 56, whereby the reset key 39 is held in the initial position by virtue of the spring force of the reset spring 40. FIG. 2 shows a positional relationship between the stopper portion 13, the spring portion 55, the key operating portion 56 and the shaft operating portion 57 with the dial 4 located in the FACE position, and the stopper portion 13 corresponds to the stopper member, the spring portion 55 to the spring member, and the key operating portion 56 to the key operating portion.

When the dial 4 is operated to rotate forward, the shaft 54 is operated to rotate in a direction indicated by an arrow in FIG. 2 as a result of the cam portion 12 of the dial gear 11 pressing against the shaft operating portion 57. When the shaft 54 is operated to rotate in the direction indicated by the arrow in FIG. 2, the key operating portion 56 moves in an approaching direction in which it approaches the reset key 39 to thereby press operate the reset key 39. When the dial 4 is operated to rotate backward, the shaft 54 is operated to rotate in an opposite direction to the direction indicated by the arrow in FIG. 2 as a result of the cam portion 12 of the dial gear 11 pressing against the operating portion 57. When the shaft 54 is operated to rotate in an opposite direction to the direction indicated by the arrow in FIG. 2, the key operating portion 56 moves in a separating direction in which it separates away from the reset key 39.

Figure 4:
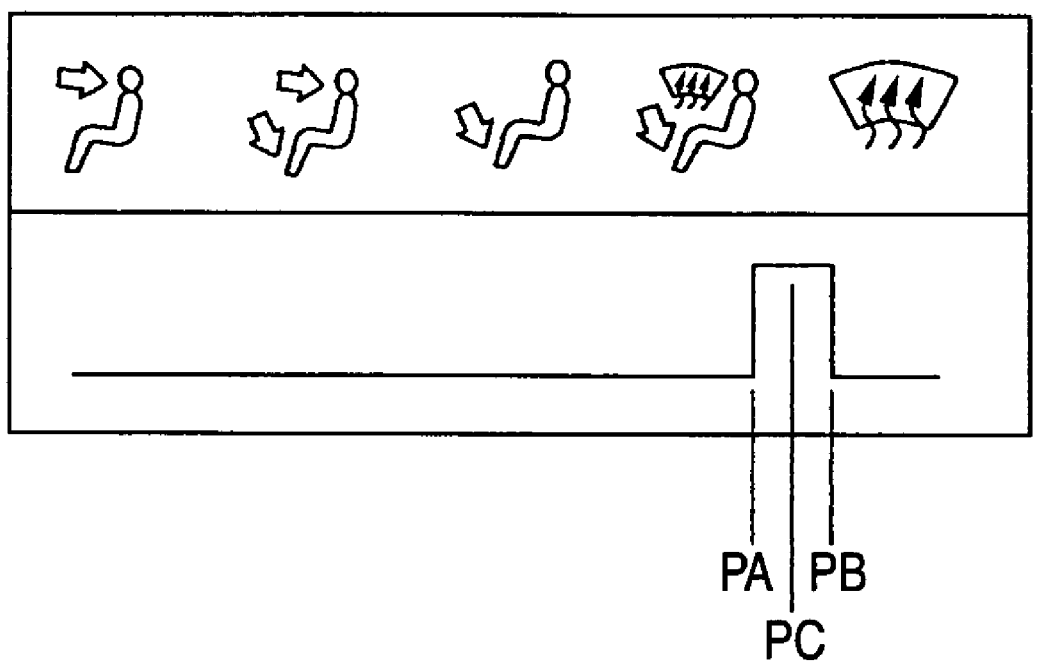
FIG. 4 is a drawing showing a relationship between operating positions of a dial and operating states of the reset mechanism.

FIG. 4 shows an engagement state between the cam portion 12 of the dial bear 11 and the shaft operating portion 57 of the shaft 54 in relation to the operating position of the dial 4, and when the dial 4 is operated to rotate forward, the cam portion 12 is brought into engagement with the shaft operating portion 57 within a range from an operating position PA resulting after the dial 4 has passed the F/D position to an operating position PB resulting before the dial 4 has reached the DEF position, whereas when the dial 4 is operated to rotate backward, the cam portion 12 is brought into engagement with the shaft operating portion 57 within a range from the operating position PB resulting after the dial has passed the DEF position to the operating position PA resulting before the dial 4 has reached the F/D position.

When the dial 4 is operated to rotate forward from any of the FACE position, B/L position, FOOT position and F/D position to the DEF position in such a state that the knob 52 is locked in the inside air position, the cam portion 12 presses against the shaft operating portion 57 at a point in time where the dial 4 has reached the operating position PA, whereby the shaft 54 rotates in the direction indicated by the arrow in FIG. 2. Due to this, the reset key 39 is forced into the inside of the switch case 32 by the key operating portion 56 and reaches the reset position when the dial 4 has reached an operating position PC. As shown in FIG. 4, this operating position PC constitutes an intermediate position between the operating position PA and the operating position PB, and when the reset key 39 has reached the reset position, the push button 31 of the inside air/outside air changing over switch 30 returns from the depressed position to the normal position, and the inside air/outside air changing over switch 30 is forced to be changed over from the ON state to the OFF state. Consequently, the knob 52 interlocks with the push button 31 and returns from the inside air position to the outside air position, and the air conditioner closes the inside air inlet and opens the outside air inlet.

When the dial 4 has passed the operating position PB in the forward rotating direction, the cam portion 12 passes the shaft operating portion 57. Then, since the operation force applied from the cam portion 12 to the shaft operating portion 57 disappears, the key operating portion 56 is pressed by virtue of the returning force of the reset key 39 and returns to the neutral state as a result of the shaft 54 rotating in the opposite direction to the direction indicated by the arrow. Namely, the shaft 54 is put in the neutral state in such a state that the dial 4 is operated to rotate forward to the DEF position.

When the dial 4 is operated to rotate backward from the DEF position, the cam portion 12 presses against the shaft operating portion 57 at a point in time where the dial 4 has reached the operating position PB, and the shaft 54 rotates in the opposite direction to the direction indicated by the arrow in FIG. 2, whereby the spring portion 55 is brought into contact with the stopper portion 13 to thereby be elastically deformed. When the dial 4 has passed the operating position PA, since the operation force applied from the cam portion to the shaft operating portion 57 disappears as a result of the cam portion 12 passing the shaft operating portion 57, the shaft 54 returns to the neutral state as a result of rotating in the direction indicated by the arrow in FIG. 2 by virtue of the elastic returning force of the spring portion 55. Namely, since the shaft 54 remains in the neutral state even when the dial 4 lies in any of the DEF position, FACE position, B/L position, FOOT position and F/D position, the knob 52 can be operated between the outside air position and the inside air position.

As shown in FIG. 5, a conductor plate 58 is insert molded into the insulator 2. This conductor plate 58 is such as to constitute part of the switch circuit and is made by applying a tin plating to a surface of a copper plate. A reflecting portion 59 is formed on the conductor plate 58. This reflecting portion 59 is formed as a result of pressing the conductor plate 58 and passes through an opening 60 in the insulator 2 so as to project into the inside of the dial base 3.

A lamp 61 corresponding to a light source is installed at a central portion of the insulator 2, and the lamp 61 is connected to the conductor plate of the insulator 2. The lamp 61 is such as to be supplied with power via the conductor plate, and when the lamp 61 is illuminated, light is projected to the outside of the dial base 3 through the plurality of slits formed in the dial base 3. This lamp 61 is such as to be disposed within an extension area which rectilinearly connects the pointer 5 with the inside air/outside air changing over switch 30 in such a state that the dial 4 stops in the FOOT position, and the pointer 5 is illuminated directly from light projected from the lamp 61 when the dial 4 stops in any of the FACE position, B/L position, F/D position and DEF position, and when the dial 4 stops in the FOOT position, the pointer 5 is illuminated indirectly by light reflected from the reflecting portion 59. Namely, the reflecting portion 59 is such as to constitute an inclined surface which reflects light projected from the lamp 61 towards the pointer 5 in such a state that the dial 4 stops in the FOOT position.

According to the first embodiment that has been described heretofore, the following advantages are provided.

When the dial 4 is operated to rotate forward to the operating position PC with the knob 52 lying in the depressed state, the cam portion 12 operates the key operating portion 56 to move the reset key 39 in the approaching direction so as to operate the reset key 39 as a result of the key operating portion 56 moving in the approaching direction. Then, the push button 31 returns from the depressed position to the normal position, and interlocking with the bush button 31, the knob 52 returns from the depressed state to the normal state. Due to this, since the driver only has to operate the dial 4 to rotate to the DEF position so that the knob 52 is forced to return from the depressed state to the normal state, the operability is increased.

The operation force applied to the key operating portion 56 from the cam portion 12 disappears when the dial 4 has passed the operating position PC in the forward rotating direction. Then, the key operating portion 56 returns to the neutral state by virtue of the returning force of the reset key 39, and the operation force applied to the reset key 39 from the key operating portion 56 disappears. Due to this, after the driver operates the dial 4 to rotate to the DEF position so as to forcibly return the dial 4 to the normal state, the dial 4 can be operated freely between the normal state and the depressed state.

When the dial 4 is operated to rotate backward to the operating position PC, the cam portion 12 operates the key operating portion 56 to move in the separating direction, and interlocking with the key operating portion 56, the spring portion 55 moves in the separating direction. Then, the spring portion 55 is elastically deformed as a result of being brought into contact with the stopper portion 13 and biases the key operating portion 56 in the approaching direction by virtue of elastic restoring force thereof. When the dial 4 has passed the operating position PA lying after the operating position PC, the operation force applied to the key operating portion 56 from the cam portion 12 disappears, whereby the key operating portion 56 returns to the neutral state by virtue of the elastic restoring force of the spring portion 55. Namely, when the dial 4 is operated to rotate backward with the knob 52 locked in the depressed state, no operation force is applied to the reset key 39 from the key operating portion 56, whereby the knob 52 is held in the depressed state, and therefore, a forcible returning function of the knob 52 can be made to be triggered only when the dial 4 is operated to rotate forward.

Light projected from the lamp 61 is made to be reflected to the pointer 5 side by the reflecting portion 59 in such a state that the dial 4 is rotated to the FOOT position. Due to this, since light projected from the lamp 61 can be emitted to the pointer 5 by bypassing the inside air/outside air changing over switch 30, the pointer 5 can be illuminated sufficiently without being disturbed by the inside air/outside air changing over switch 30. Moreover, since the reflecting portion 59 is formed by partially bending the predetermined conductor plate 58 which constitutes the switch circuit, the necessity of a reflector can be obviated which would otherwise be necessary to reflect light projected from the lamp 61 towards the pointer 5 side. Due to this, since the number of components can be reduced, both the production costs and the number of manhours can be reduced.

In the first embodiment that has been described heretofore, while the reflecting portion 59 is formed by partially bending the predetermined conductor plate 58 which constitutes the switch circuit, the invention is not limited thereto, and hence, for example, the reflecting portion 59 may be formed by partially bending a conductor plate which supplies power to the lamp 61.

In the first embodiment that has been described heretofore, while the operating position PC is set to lie between the F/D position and the DEF position, the invention is not limited thereto, and hence, for example, the operating position PC may be set so as to lie between the FOOT position and the F/D position. Namely, when the dial 4 is operated to rotate to the F/D position with the knob 52 staying in the depressed position, the knob 52 may be made to return from the depressed state to the normal state.

What is claimed is:

1. An automotive air conditioning switch system comprising:
   a dial provided so as to be operated to rotate;
   a switch including a push button adapted to be locked in a depressed position by being pressed from a normal position and to be restored to the normal position by being pressed from the depressed portion, and a key for restoring the push button from the depressed position to the normal position;
   a knob linked to the push button for operating the push button;
   a key operating member movable in an approaching direction in which the key operating member approaches the key and in a separating direction in which the key operating member separates from the key, the key operating member operating the key by moving in the approaching direction;
   a stopper member for standing still relative to the key operating member;
   a spring member adapted to be brought into contact with the stopper member by moving the key operating member in the separating direction so that the spring member is deformed elastically to bias the key operating member in the approaching direction; and
   a cam member for moving in response to a rotational operation of the dial,
   wherein, when the dial is operated to rotate forward to a specific position, the cam member moves the key operating member in the approaching direction to operate the key, and when the dial is operated to rotate backward to a specific position, the cam member moves the key operating member in the separating direction, and
   wherein, when the dial is operated to rotate further forward to pass the specific position, the key operating member returns to a neutral state where no operation force is applied to the key due to returning force of the key, and when the dial is operated to rotate further backward to pass the specific position, the key operating member returns to the neutral state due to the elastic restoring force of the spring member.

* * * * *